United States Patent

[11] 3,538,952

| [72] | Inventor | Friedrich Bayer |
| | | Deilinghofen, Germany |
| [21] | Appl. No. | 707,629 |
| [22] | Filed | Feb. 23, 1968 |
| [45] | Patented | Nov. 10, 1970 |
| [73] | Assignee | Friedrich Grohe Armaturenfabrik |
| | | Hemer, Germany |
| [32] | Priority | Feb. 23, 1967, July 5, 1967 |
| [33] | | Germany |
| [31] | | Nos. G 49,369 and G 50,560 |

[54] VALVE
16 Claims, 12 Drawing Figs.

[52] U.S. Cl. ............................................. 137/625.17,
251/175, 251/186
[51] Int. Cl. ............................................. F16k 11/00
[50] Field of Search ............................................. 137/625.17,
625.4, 625.41, 636.4; 251/182

[56] References Cited
UNITED STATES PATENTS

| 2,566,071 | 8/1951 | Schobert | 251/182 |
| 2,711,185 | 6/1955 | Rhodes | 251/182X |
| 3,282,295 | 11/1966 | Skriletz et al. | 137/625.17 |
| 3,410,487 | 11/1968 | Hyde | 137/625.17X |
| 3,415,280 | 12/1968 | Bucknell et al. | 137/625.17 |

Primary Examiner—Robert R. Mackey
Attorney—Michael S. Striker

ABSTRACT: A valve whose valve member is rotatable and/or reciprocable in a cylindrical surface of the housing and is surrounded by a slotted flexible wear-resistant plastic sleeve biased radially against the housing by elastic members inserted between the valve member and sleeve. The sealing action of the elastic members can be enhanced by forming the valve member with recesses receiving pressurized fluid from the inlet of the housing when the valve is closed so that the fluid bears against the internal surface of the sleeve and maintains it in sealing engagement with the housing.

Patented Nov. 10, 1970
3,538,952
Sheet 1 of 2
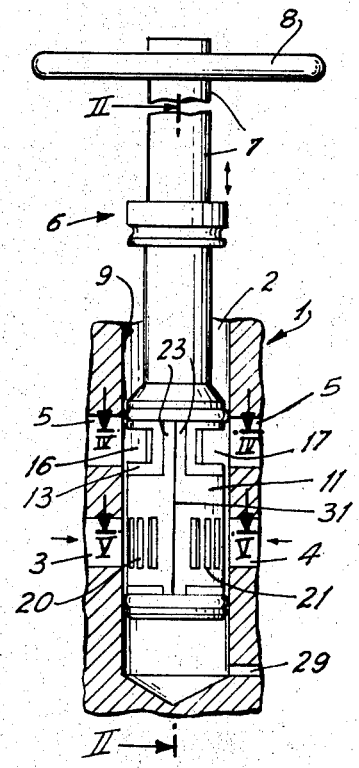
FIG.1
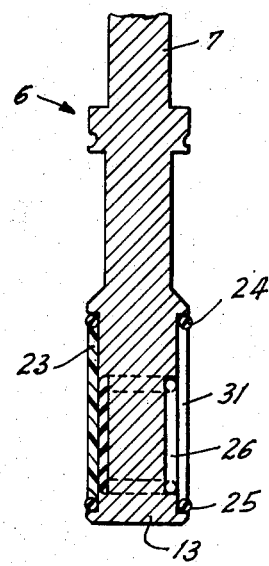
FIG.2
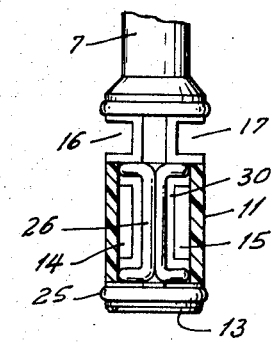
FIG.3
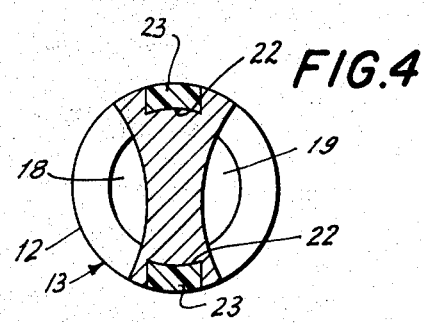
FIG.4
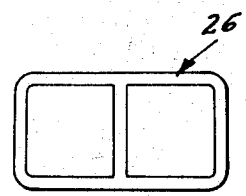
FIG.6
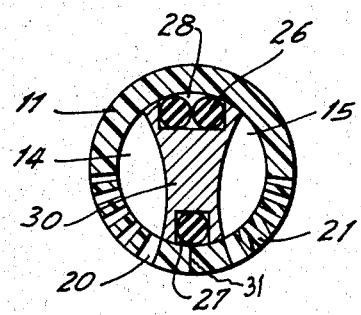
FIG.5
FIG.7
INVENTOR
FRIEDRICH BAYER
BY
Michael J. Striker
ATTORNEY INVENTOR
FRIEDRICH BAYER
BY Michael J. Striker
ATTORNEY

VALVE

BACKGROUND OF THE INVENTION

The present invention relates to valves in general, and more particularly to improvements in means and devices for establishing fluidtight seals between stationary and movable parts of a valve. Still more particularly, the invention relates to improvements in valves of the type wherein a valve member is rotatable and/or axially movable with reference to the housing in order to initiate, terminate and/or regulate the flow of fluids between one or more inlets and one or more outlets.

In presently-known valves which are utilized for regulating the flow and/or mixing of fluids, the valve member is provided with one or more elastic O-rings or analogous sealing elements which bear against the adjoining surface or surfaces of the housing to prevent uncontrolled leakage of fluids in or from the valve. In order to furnish a satisfactory sealing action, such sealing elements must be inserted in prestressed condition or they must be stressed in response to movement of the valve member so that they undergo considerable wear and require frequent replacement. Wear on the sealing elements is due mainly to frictional rubbing engagement with the housing of the valve and also due to corrosive or other undesirable influences of fluids which are being controlled. For example, water often contains minerals which settle on the surfaces of the valve member and/or housing to cause greatly increased wear upon elastic seals by increasing friction between the surfaces and such seals. Furthermore, the conveyed fluids may attack the material of elastic seals when the valve member is idle and they may penetrate into and deposit in hard-to-reach and hard-to-clean bores, channels or like passages of the valve member and/or housing.

SUMMARY OF THE INVENTION

It is an object of my invention to provide a valve wherein the wear on sealing elements which are inserted between the stationary and moving parts is reduced or eliminated in a simple and inexpensive way.

Another object of the invention is to provide a valve wherein the pressure of fluids whose flow is controlled can be used to enhance the sealing action when the valve is closed and/or to prevent leakage between such portions of the valve which must remain sealed from each other.

A further object of the invention is to provide a valve which may be used as a means for effecting controlled mixing of two or more different fluids (e.g., for mixing of hot and cold water) and wherein the fluids are sealed from each other and their uncontrolled escape prevented in a novel way which insures longer useful life of the valve and accurate metering of fluids.

Still another object of the invention is to provide a novel device which may be used to form a reliable and long-lasting seal between the stationary and movable parts of a valve, particularly of a valve which can be used to control the flow of liquids into sinks, bath tubs, troughs and/or other types of receptacles.

A concomitant object of the invention is to provide a valve wherein the sealing action between relatively movable parts can be established by resorting to parts which need not be elastic, whose useful life is much longer than that of presently employed elastic seals, and wherein the parts can be moved by exertion of a small force.

Briefly outlined, my invention is embodied in a valve which comprises a housing having a passage surrounded by a preferably smooth internal surface, a valve member which is movable in the passage and has an external surface spaced from the internal surface of the housing, and a sleeve or another envelope consisting of highly wear-resistant synthetic plastic material which is preferably flexible but need not always be elastic and is interposed between the two surfaces to provide a seal serving to prevent leakage of fluid between the exterior of the sleeve and the internal surface of the housing. The sealing action can be enhanced by placing one or more prestressed elastic elements between the internal surface of the sleeve and the external surface of the movable valve member so that the elastic elements bias the sleeve against the internal surface of the housing. The sleeve is preferably secured to the valve member so that it shares all movements of the valve member; thus, the sealing elements are not subjected to any wear because they are interposed between the sleeve and the valve member, i.e. between two parts which need not move with reference to each other. Such sealing elements may be used to simultaneously provide fluidtight seals around recesses, bores, depressions, channels or like cavities in the external surface of the valve member to prevent uncontrolled leakage of fluids between the sleeve and the valve member.

In accordance with another feature of my invention, the sealing element or elements may be omitted if the external surface of the valve member is provided with one or more auxiliary cutouts, recesses, repressions or like cavities which communicate with the inlet or inlets of the valve housing when the valve member is in sealing position so that the fluid which enters the cavities by way of one or more apertures in the sleeve can exert pressure against the internal surface of the sleeve in order to press the latter against the internal surface of the housing and to thus prevent leakage of fluid along the internal surface. This feature can be resorted to as a substitute for or in addition to the aforementioned sealing elements.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a valve which embodies one form of my invention and is employed for mixing of hot and cold liquids;

FIG. 2 is a fragmentary axial sectional view of the valve member in the valve of FIG. 1 as seen in the direction of arrows from the line II–II of FIG. 1;

FIG. 3 is a fragmentary elevational view of the valve member with the envelope shown in axial section;

FIG. 4 is a horizontal sectional view of the valve member as seen in the direction of arrows from the line IV–IV of FIG. 1;

FIG. 5 is a horizontal sectional view of the valve member as seen in the direction of arrows from the line V–V of FIG. 1;

FIG. 6 is an elevational view of a sealing element in the form it assumes prior to insertion between the valve member and the envelope;

FIG. 7 is a top plan view of the sealing element in deformed condition;

DESCRIPTION OF THE PREFERRED EMBODIMENTS

Figure 9:
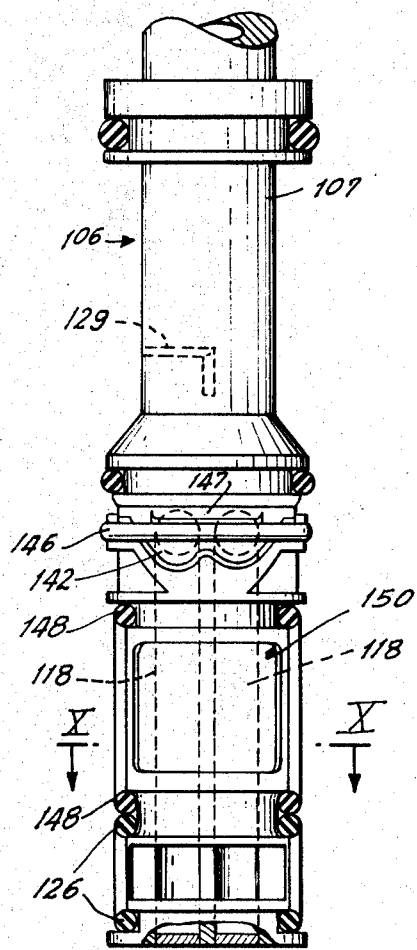
FIG. 9 is an elevational view of the valve member in the valve of FIG. 8 as seen in the direction of arrow IX.

Referring first to FIGS. 1 to 5, there is shown a valve which may be utilized for mixing of cold and hot water. This valve comprises a housing 1 having a passage 2 which communicates with inlets 3, 4 for cold and hot water, and a mixing chamber 5 which can be placed in communication with or sealed from the inlets 3, 4, depending on the axial and/or angular position of a reciprocable and/or turnable valve member 6 having a rising stem 7 coupled to a wheel 8 or another suitable actuating member in a manner not forming part of the present invention. It suffices to say that the valve member 6 rises or descends in response to pull or push and/or rotation of the wheel 8. FIG. 1 shows the valve member 6 in its uppermost position wherein the valve member permits the flow of maximum quantities of cold and hot water into the mixing chamber 5. When the valve member 6 is moved to its lower end position, the mixing chamber 5 can be completely sealed from the inlets 3 and 4. The passage 2 in the housing 1 is bounded by a smooth cylindrical internal surface 9 which is engaged by a cylindrical envelope or sleeve 11 applied around an external cylindrical surface 12 of the lower portion or spool 13 of the valve member 6. The surface 12 is formed with two recesses 14, 15 which are surrounded by the sleeve 11 and respectively register with the inlets 3, 4 when the valve member 6 assumes the position shown in FIG. 1. Two additional recesses 16, 17 are provided in the external surface 12 of the spool 13 at a level above the annular portion of the sleeve 11 and respectively communicate with the recesses 14, 15 by way of axially parallel channels 18, 19 (See FIG. 4) machined into the spool 13. The sleeve 11 is formed with two groups of slit-shaped apertures 20, 21 which respectively communicate with the lower recesses 14 and 15 to admit cold and hot water when the valve member 6 assumes the position shown in FIG. 1. Cold water flows from the inlet 3, through apertures 20, through the lower recess 14, channel 18, upper recess 16 and into the mixing chamber 5. Hot water flows from the inlet 4, through apertures 21, recess 15, channel 19, recess 17 and into the chamber 5 where it is mixed with cold water. The chamber 5 has an outlet, not shown, through which the mixture of cold and hot water issues from the housing 1.

The sleeve 11 preferably consists of a highly wear-resistant flexible synthetic plastic material, for example, Teflon (trademark), which is readily slidable with reference to the internal surface 9. In order to insure that the sleeve 11 cannot turn with reference to the spool 13, the latter is provided with two axially parallel grooves 22, which receive extensions or tongues 23 provided on the sleeve 11. Two elastic O-rings, 24, 25 are received in circumferential grooves machined into the external surface 12 of the spool 13 adjacent to the upper and lower axial ends of the sleeve 11. These O-rings are optional. In addition, the valve member 6 comprises a specially configurated sealing element 26 (best shown in FIGS. 6 and 7) which is inserted between the spool 13 and sleeve 11 to bias the latter against the internal surface 9 of the housing 1 and to simultaneously provide a fluidtight seal around the lower recesses 14 and 15. The sealing element 26 is preferably of circular cross section and may consist of rubber or other suitable elastomeric material. When in undeformed condition, the sealing element 26 resembles a rectangle (FIG. 6) having two longer sides, two shorter sides and a centrally located rib parallel with the shorter sides and extending midway between the longer sides. When applied around the spool 13, the rib extends into an axially parallel groove 27 in the spool 13 (See FIG. 5) and the two shorter sides extend into a wider second groove 28 located diametrically opposite the groove 27. The longer sides of the sealing element 26 then extend into two circumferential grooves of the spool 13 which are respectively located at levels above and below the recesses 14, 15. The grooves 27, 28 are disposed between these recesses. Thus, when the element 26 is properly inserted between the spool 13 and sleeve 11, it provides a very satisfactory seal around the recesses 14, 15 to prevent uncontrolled flow of liquid between these recesses and, in addition, the element 26 biases the sleeve 11 against the internal surface 9 to prevent leakage of fluid from the inlets 3, 4 directly into the mixing chamber 5 and/or from the inlet 3 into the inlet 4 or vice versa.

It is clear that the one-piece sealing element 26 can be replaced by a composite sealing element or by other biasing means which can provide a fluidtight seal between the recesses 14, 15 and is capable of maintaining the sleeve 11 in satisfactory sealing engagement with the internal surface 9 of the housing 1. It is further clear that the valve member 6 can be arranged to move up and down and to simultaneously rotate about its axis or that the valve member can establish or terminate communication between the inlets 3, 4 and mixing chamber 5 in response to simple angular displacement about its axis. Furthermore, and if the inlet 4 is sealed from a source of hot water, the valve of FIGS. 1 to 7 may be used for delivery of controlled amounts of cold water from the inlet 3 to the outlet which receives liquid from the mixing chamber 5. The same holds true for controlled flow of hot water if the inlet 3 is either omitted or sealed from the source of cold water. In such simplified valves, the spool 13 of the valve member 6 may be provided with only one pair of recesses 14, 16 or 15, 17 and with a single channel (18 or 19). Also, the sealing element 26 can be replaced by a simpler sealing element which is then required to form a seal only around one of the recesses 14, 15.

When the valve of FIG. 1 is closed, i.e., when the valve member 6 is moved to its lower end position, the sealing action of the sleeve 11 is assisted by the upper O-ring 24 which then bears against the internal surface 9 of the housing 1 at a level below the mixing chamber 5. The lower O-ring 25 seals the inlets 3, 4 from a venting orifice 29 which communicates with the passage 2 at a level below the lower end of the spool 13. The axially parallel grooves 27, 28 are machined into the convex surfaces of a web 30 which forms part of the spool 13 and extends all the way between the lower ends of recesses 14, 15 and the lower ends of recesses 16, 17. The sleeve 11 may consist of a rectangular piece of flexible plastic material which is convoluted around the external surface 12 so that its vertical edges abut against each other, as at 31. The slit-shaped apertures 20, 21 of the sleeve 11 can be replaced by otherwise configurated apertures having an area which equals the combined area of these apertures, but the provision of relatively small slit-shaped or like apertures is normally preferred in order to avoid undue weakening of the sleeve.

In accordance with a presently preferred embodiment of my invention, the valve member 6 is installed in the housing 1 in such a way that it is turnable and axially movable in passage 2. In response to turning of the spool 13 with reference to the internal surface 9, the user can place a greater or lesser number of apertures 20, 21 into registry with the inlets 3 and 4, i.e., such turning determines the quantities of cold and hot water which can flow into the recesses 14, 15 per unit of time. By moving the valve member 6 upwardly or downwardly, the user can determine the extent to which the upper recesses 16, 17 communicate with the adjoining portions of the mixing chamber 5, i.e. such reciprocatory movements of the valve member determine the rate at which cold and hot water can enter the chamber 5 and the rate at which the resulting mixture issues from the outlet of the housing.

An important advantage of the improved valve is that the sleeve 11 replaces conventional gaskets or washers of rubber or leather which must be maintained in strong frictional engagement with the metallic surface of the valve housing and thus undergo considerable wear. The material of the sleeve 11 is such that it can readily slide along the internal surface 9 but remains in very satisfactory sealing engagement therewith, particularly due to the bias of the sealing element 26 which is inserted in at least slightly stressed condition. This sealing element 26 undergoes no wear because it is inserted between two parts (sleeve 11 and spool 13) which move as a unit with reference to the housing 1. The user can regulate the outflow of water by exerting a very small force. The useful life of the parts in my improved valve is much longer than that of parts in conventional mixer valves wherein the valve member carries rubberlike sealing elements which are in direct rubbing and sealing engagement with a stationary housing.

A sleeve of "Teflon" or analogous synthetic plastic material is much more resistant to wear than seals which consist of rubber or the like, and such sleeve is also capable of withstanding wear on repeated rubbing contact with minerals which are conveyed by water and settle on or adhere to the internal surface 9 of the housing 1. By properly selecting the material of the sleeve, the manufacturer can insure that the useful life of elastic parts in the valve exceeds many times the useful life of elastic parts in presently known valves wherein the elastic parts are in direct frictional engagement with the housing. Furthermore, and since the sleeve 11 is readily slidable with reference to the housing 1, the operator must exert a very small force in order to change the angular and/or axial position of the valve member 6. The valve may be put to a practically unlimited number of different uses. It was found that the valve is particularly useful for controlling the flow of liquids, especially of water in various sanitary installations in homes, industrial establishments, apartment houses and/or others.

Figure 8:
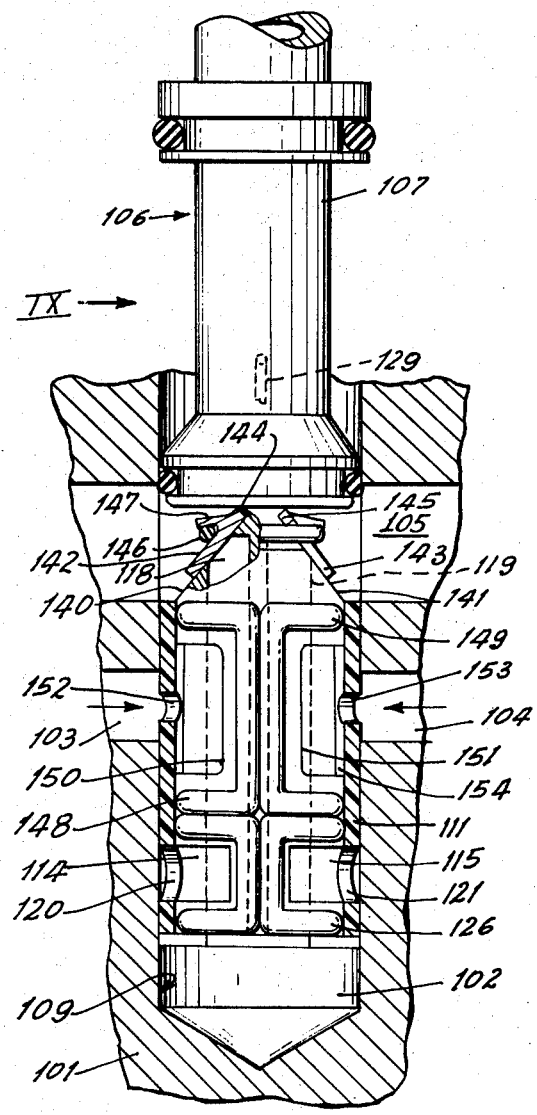
FIG. 8 is a fragmentary axial sectional view of a second valve.
Figure 10:
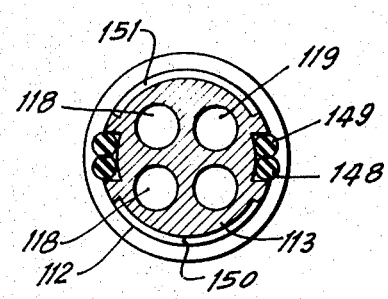
FIG. 10 is a horizontal sectional view of the valve member as seen in the direction of arrows from the line X–X of FIG. 9.
Figure 11:
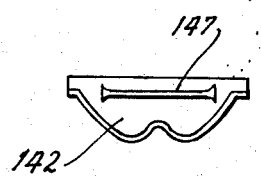
FIG. 11 is a front elevational view of a flap in the valve of FIG. 8.
Figure 12:
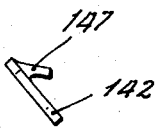
FIG. 12 is an end elevational view of the flap.

FIGS. 8 through 12 illustrate a modified valve wherein the pressure of liquid assists the sealing action between a plastic sleeve 111 and the internal surface 109 in the passage 102 of the housing 101. The housing 101 is provided with inlets 103, 104 which are respectively connected with sources of cold and hot water, and with a mixing chamber 105. The valve member 106 comprises a stem 107 which carries a spool 113 having a cylindrical external surface 112 provided with two recesses 114, 115 located diametrically opposite each other and movable into partial or full registry with the inlets 103, 104. Each of these recesses respectively communicates with a pair of axially parallel channels 118, 119 (see particularly FIG. 10) the upper ends of which terminate in the surfaces of two mutually inclined seats 140, 141 of the spool 113 at a level above the upper end of the sleeve 111. These channels are normally sealed from the mixing chamber 105 by two one-way valves here shown as flaps 142, 143 which overlie the seats 140, 141 but can move away from such seats to permit flow of water into the mixing chamber 105 when the recesses 114, 115 respectively communicate with the inlets 103, 104. The spool 113 is provided with two parallel horizontal notches 144, 145 which receive the upper edge portions of flaps 142, 143 in such a way that the respective flaps can pivot about two horizontal axes. The means for normally biasing the flaps to sealing positions (abutment with the seats 140, 141) comprises a helical spring 146 which is applied around the spool 113 and around the flaps in a manner clearly shown in FIGS. 8 and 9. The flaps are provided with locating projections or teeth 147 which prevent the spring 146 from advancing into the notches 144, 145. The sealing element 126 is inserted between the sleeve 111 and spool 113 in the same way as described for the element 26, i.e., the element 126 surrounds the recesses 114, 115 and biases the lower portion of the sleeve 111 against the internal surface 109. In order to enhance the sealing action of the sleeve 111, the valve of FIGS. 8 to 12 further comprises one or more additional sealing elements 148, 149 which are inserted between the sleeve and the spool 113 in a region above the sealing element 126. The cylindrical surface 112 of the spool 113 is provided with two shallow arcuate depressions, recesses or cutouts 150, 151 which are surrounded by the sealing elements 148, 149. The sleeve 111 has two auxiliary apertures 152, 153 which respectively communicate with the depressions 150, 151 and which also communicate with the inlets 103, 104 when the valve member 106 is held in the sealing position shown in FIG. 9. Thus, water can penetrate into the depressions 150, 151 to exert pressure against the internal surface of the sleeve 111 and to maintain it in satisfactory sealing engagement with the internal surface 109. In this embodiment of my invention, the sealing element 126 mainly serves to prevent leakage of liquid between the recesses 114, 115 whereas the pressure of liquid in inlets 103, 104 is used to enhance the sealing action between the housing 101 and sleeve 111. The depressions 150, 151 do not replace the recesses 16, 17 of FIGS. 1 to 3; they are provided for the express purpose of admitting pressurized fluid to the inner side of the sleeve 111 when the valve member 106 is moved to sealing position. The apertures 20, 21 of the sleeve 11 are replaced by larger apertures 120, 121 shown in FIG. 8. The venting orifice 129 is provided in the valve member 106 and communicates with the passage 102 at a level below the lower end of the spool 113. The annular space 154 formed by the depressions 150, 151 is of relatively small width.

An important advantage of the valve shown in FIGS. 8 to 12 is that the liquid which has been admitted into the mixing chamber 105 cannot flow back into the recesses 114, 115 when the recesses are sealed from the inlets 103, 104. This is insured by the provision of one-way valves including the flaps 142, 143 which seal the upper ends of the channels 118, 119 as soon as the pressure in these channels drops sufficiently to allow the spring 146 to move the flaps against the adjoining seats 140, 141.

The area of the internal surfaces of those portions of the sleeve 111 which are adjacent to the depressions 150, 151 preferably exceeds several times the cross-sectional areas of the inlets 103, 104. This insures a highly satisfactory sealing action between the sleeve 111 and the internal surface 109 when the valve member 106 is moved to sealing position. The sleeve 111 need not be elastic; it is preferably slotted axially in the same way as shown at 31 in FIG. 1 so that it can expand slightly when the depressions 150, 151 communicate with the inlets. The abutting edge portions of the sleeve 111 are adjacent to the ribs which separate the depressions 150, 151 from each other. If the valve member 106 is arranged to rotate, the sleeve 111 is connected thereto in such a way that it shares all angular movements of the spool 113.

The flaps 142, 143 replace conventional pedal-actuated valves which are often provided in many types of presently known armatures and must be manipulated independently of the valve member. These flaps may consist of rubber-coated metal, synthetic plastic material or the like.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

I claim:

1. In a valve, particularly for controlling the flow of liquids, a combination comprising a housing defining a passage surrounded by an internal surface; a valve member movably accommodated in said passage and having an external surface provided with at least two recesses, and at least one channel connecting said recesses; an envelope interposed between said surfaces and secured to said valve member for movement therewith relative to said housing, said envelope being provided with at least one aperture communicating with one of said recesses; biasing means for urging said envelope against said internal surface, said biasing means comprising elastic means at least a portion thereof surrounding said one recess and being in sealing engagement with said envelope; an inlet and an outlet communicating with said passage and terminating at said internal surface; and means connected to said valve member for moving the same between at least one pair of positions in one of which said envelope seals the other of said recesses from said outlet and said aperture from said inlet and in the other of which said aperture communicates with said inlet and said other recess with said outlet.

2. A combination as defined in claim 1, wherein said valve member is rotatable in said housing.

3. A combination as defined in claim 1, wherein said valve member is reciprocable in said housing.

4. A combination as defined in claim 1, wherein said surfaces are cylindrical and wherein said biasing means is arranged to urge said envelope radially outwardly with reference to the axis of said valve member.

5. A combination as defined in claim 1, further comprising at least one tongue-and-groove connection provided between said envelope and said valve member to compel said envelope to share the movements of said valve member with reference to said housing.

6. A combination as defined in claim 1, wherein said envelope is a sleeve and said surfaces are substantially cylindrical, said housing having a pair of inlets for different types of fluids extending outwardly from said internal surface and said outlet comprises a mixing chamber axially spaced from said inlets and extending outwardly from said internal surface, said valve member having first and second pairs of recesses provided in said external surface thereof and a pair of channels each connecting one recess of the first pair with one recess of the second pair, said envelope comprising first and second apertures each communicating with one recess of said first pair and said valve member being movable to at least one position in which said envelope respectively seals said second pair of recesses from said mixing chamber and said apertures are sealed from said inlets so that said envelope then prevents flow of fluids from said inlets to said mixing chamber, and at least one second position in which each of said apertures communicates with one of said inlets and the recesses of said second pair communicate with said mixing chamber so that the fluids can flow from said inlets to said mixing chamber by way of said first pair of recesses and said channels.

7. A combination as defined in claim 1, wherein said envelope is an annular sleeve having an axially parallel slit so that the sleeve can expand in response to the action of said biasing means.

8. A combination as defined in claim 1, wherein said surfaces are cylindrical and said valve member has a rising stem and a spool received in said passage, said envelope comprising a plastic sleeve surrounding at least a portion of said spool.

9. A combination as defined in claim 1, wherein said envelope consists of wear-resistant nonmetallic material.

10. In a valve, particularly for controlling the flow of liquids, a combination comprising a housing defining a passage surrounded by an internal surface; a valve member movably accommodated in said passage and having an external surface; an envelope interposed between said surfaces and secured to said valve member for movement therewith relative to said housing; a fluid admitting inlet in said housing terminating at said internal surface and admitting pressurized fluid against said envelope in at least one position of said valve member; biasing means for urging said envelope against said internal surface, said biasing means comprising a recess provided in said external surface opposite said inlet in said one position of said valve member and at least one aperture provided in said envelope in communication with said recess to admit pressurized fluid into said recess whereby such fluid biases the envelope against the internal surface of said housing, the area of said recess exceeding the area of said inlet so that said envelope is biased into sealing engagement with that portion of said internal surface which surrounds said inlet when the valve member is moved to said one position; a second recess in said external surface of said valve member, said second recess being in registry with said inlet in another position of said valve member and said envelope being provided with a second aperture which communicates with said second recess to admit to said second recess fluid in said other position of said valve member and said biasing means further comprising elastic sealing means interposed between said envelope and said external surface and surrounding said second recess to prevent leakage of fluid between said recesses; a channel in said valve member communicating at one end with said second aperture when said valve member is in said second position; an outlet in said housing terminating at said inner surface and communicating with said other end of said channel; and means connected to said valve member for moving the same between said positions thereof.

11. A combination as defined in claim 10, wherein said envelope consists of wear-resistant nonmetallic material.

12. A combination as defined in claim 10, and one-way valve means provided at the other end of said channel to seal said other end.

13. A combination as defined in claim 12, wherein said one-way valve means comprises a flap and means for urging said flap to sealing position.

14. A combination as defined in claim 13, wherein said valve member defines a seat for said flap, said seat having a surface which is inclined with reference to said channel.

15. A combination as defined in claim 13, wherein said flap is hingedly coupled to said valve member and said means for urging the flap to sealing position comprises a spring.

16. A combination as defined in claim 15, wherein said spring is a helical spring which surrounds a portion of said valve member, said flap being provided with locating means for said spring.